United States Patent [19]

Madau et al.

[11] Patent Number: 5,491,775
[45] Date of Patent: Feb. 13, 1996

[54] MICROCONTROLLER FUZZY LOGIC PROCESSING MODULE USING SELECTABLE STORED MEMBERSHIP FUNCTION SHAPES

[75] Inventors: Dinu P. Madau, Dearborn; Lee A. Feldkamp, Plymouth; Steven H. Seippel; Fumin Yuan, both of Canton; Leighton I. Davis, Ann Arbor, all of Mich.

[73] Assignee: Ford Motor Company, Dearborn, Mich.

[21] Appl. No.: 310,894

[22] Filed: Sep. 22, 1994

Related U.S. Application Data

[63] Continuation of Ser. No. 85,799, Jul. 6, 1993, abandoned.
[51] Int. Cl.$^6$ ..................................................... G06G 7/00
[52] U.S. Cl. ................................. 315/3; 395/61; 395/900
[58] Field of Search .................................. 395/3, 61, 54, 395/900

[56] References Cited

U.S. PATENT DOCUMENTS

| | | | |
|---|---|---|---|
| 4,809,175 | 2/1989 | Hosaka et al. | 395/3 |
| 4,837,725 | 6/1989 | Yamakawa | 395/3 |
| 4,864,490 | 9/1989 | Nomoto et al. | 395/3 |
| 5,111,232 | 5/1992 | Tsunefuji | 395/900 |
| 5,184,131 | 2/1993 | Ikeda | 395/3 |
| 5,243,687 | 9/1993 | Ando et al. | 395/3 |
| 5,249,258 | 9/1993 | Hisano | 395/3 |
| 5,280,624 | 1/1994 | Ikeda | 395/3 |

OTHER PUBLICATIONS

A Fuzzy Logic Programming Environment for Real-Time Control, Dec. 31, 1988 Stephen Chiu, Masaki Togai.

*Primary Examiner*—Allen R. MacDonald
*Assistant Examiner*—Richemond Dorvil
*Attorney, Agent, or Firm*—Raymond L. Coppiellei; Roger L. May

[57] ABSTRACT

A standardized microcontroller-based fuzzy logic processing module for generating control signal values in response to variable input signal values in accordance with constraints imposed by propositions or "rules" stored in memory in a standardized format. Each rule consists of one or more input conditions and an output directive. Each input signal and the output signal values are characterizable by their degree of membership in a predetermined number of fuzzy sets, each fuzzy set being defined by a membership function. Each input condition is composed of a reference to a particular input variable, which has been preprocessed into integer (whole number) normalized form and a reference to a membership function. Each output directive includes a reference to a further membership function. Each membership function is implemented by one of a three possible forms of standard membership data structures: a triangular function represented by three data points, a table lookup function represented by a two end data points and the points between these two end points, and an standard shape function composed of a set of data points and a set of reference points used to form a similar shape function by interpolation. Fuzzy logic processing is accomplished by determining the extent to which the input conditions are satisfied by the current values of the input signals in order to develop a rule strength value, and then performing a "center-of-gravity" determination based on the output membership function values of each satisfied rule integrated over the range of possible output signal values.

4 Claims, 7 Drawing Sheets

| x1 | x2 | m1 | m2 | m3 | m4 | ... | mN |
|----|----|----|----|----|----|-----|----|

|  | x1 | x2 | Membership |
|--|----|----|------------|
|  |    |    | Positive Large |
|  |    |    | Positive Medium |
|  |    |    | Positive Small |
|  |    |    | Zero |
|  |    |    | Negative Small |
|  |    |    | Negative Medium |
|  |    |    | Negative Large |

MICROCONTROLLER FUZZY LOGIC PROCESSING MODULE USING SELECTABLE STORED MEMBERSHIP FUNCTION SHAPES

This application is a continuation of application Ser. No. 08/085,799 filed Jul. 6, 1993 now abandoned.

AUTHORIZATION

A portion of the disclosure of this patent document contains material which is su copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

This invention relates generally to electronic control systems and, more particularly, to a system for generating process control signals which vary in response to changing input signals in accordance with constraints imposed by rules which state system objectives.

2. Background of the Invention

Control systems typically use feedback mechanisms to vary the value of an actuating signal in response to variations in sensed system conditions. By manipulating signals which are directly proportional to sensed system conditions, as well as signals related to integrals or derivatives of sensed signals, accurate control of many dynamic systems may be successfully achieved. Such feedback control systems work well because they are able to model desired system performance, sense the state of the physical system and compare it with the desired model, and generate error-correcting feedback signals so that the physical system behaves in accordance with the desired model.

Frequently, however, even an elaborate proportional-integral-differential (PID) controller cannot accurately model more complex physical systems. Many control functions which humans easily perform cannot be automated by conventional feedback controllers. For example, the functions which an experienced automobile driver performs (turning the steering wheel, pressing the brake and accelerator pedal, and shifting gears) can't be handled by conventional controllers, because the driver's movements are based on a complex inputs which the driver processes based on past experience.

A technique called "fuzzy logic," developed by Dr. Lotfi Zadeh and described in "Fuzzy Sets," Information and Control, Vol.8. No. 3, June 1965, pp. 338–53, has proven highly effective in controlling complex systems. Using fuzzy logic, input variables are processed against a collection of rules, each of which expresses a system objective in propositional form; for example: "if velocity is low and rpm is low then shift to 1st-gear." Unlike conventional logic, in which conditions are either satisfied or not satisfied, the conditions "velocity is low" and "rpm is low" may be only partially satisfied so that the rule is only partially satisfied. As a consequence, when the input conditions are only partially satisfied, the rule and its output directive to "shift to low gear" is assigned less "rule strength." In the fuzzy logic based controller, many such rules are evaluated concurrently. The actual gear selection is performed by combining all directives from all of the satisfied rules in accordance with the degree to which each rule was satisfied, thereby arriving at a consensus directive.

Fuzzy logic control systems allow the possible state or signal values assumable by the system to be classified into "fuzzy sets," each defined by a membership function. A membership function associated with a given signal thus provides an indication of the degree-of-membership the current value of that signal has with respect to the fuzzy set. Rules express both their conditions and their directives in terms of fuzzy sets. For example, a condition that "velocity is low" might be represented by a triangular membership function which yields a maximum degree-of-membership value at 4 mph, and which goes to zero at −3 mph and +11 mph. Given a current speed value, the membership function specified in the first rule condition yields a degree-of-membership value which is then combined with the degree-of-membership value from the second condition, "rpm is low," to determine the current rule strength. The rule's directive, "shift to low gear," is also expressed as a fuzzy set, with "low gear" being represented by a membership function which yields a degree-of-membership value for each possible gear ratio.

The determination of the "consensus" among all of the applicable rules is typically accomplished by calculating the "center of gravity" of all of the rules, taking into account both their rule strength, as determined by the degree to which each rule's condition(s) were satisfied, and the shape of the membership function for the rule's output directive. In complex fuzzy logic systems employing a large number of rules, the calculations required to reach the desired consensus output value are extensive. When control systems must operate in real-time, the speed at which the desired output control values must be calculated to keep pace with rapidly changing input signal can place a substantial burden on the system's computational resources. In contrast, other control functions in the same system may use fuzzy logic rules which need to be evaluated relatively infrequently.

In many environments, such as a vehicle control system, it is desirable to perform fuzzy logic manipulations in combination with conventional control functions. In this way, a group of both fuzzy and non-fuzzy logic controllers may manipulate or respond to the same input or output signals, or share resources, such as sensors, actuators or other instrumentalities. Such related control functions are preferably implemented using a single microcontroller, suitably programmed to perform associated functions in a coordinated way.

SUMMARY OF THE INVENTION

It is a general object of the invention to perform fuzzy logic control functions by means of an efficient, standardized, general-purpose, shareable processing module which performs integer arithmetic fuzzy logic operations on input signal values by reference to conditional propositions, or "rules," having predetermined formats to produce de-fuzzified output signal values.

In accordance with a feature of the invention, fuzzy logic processing to produce one or more output control signals is performed by a digital controller consisting of a microprocessor and a memory which stores, for each of the input signals to be processed and for each output signal to be produced, a predetermined number of associated membership functions, each function specifying a predetermined degree-of-membership integer value for each integer value assumable by the associated signal.

In the preferred embodiment to be described, seven membership functions are established for each signal and represent a group of seven fuzzy sets. Although these sets are typically designated with the semantic names "negative large," "negative medium," "negative small," "zero," "positive small," "positive medium," and "positive large," the signal values which are within any given set may be any collection of values which are defined by that set's membership function.

In accordance with the invention, a membership function may assume one of three standard forms: (a) a triangular function specified by left and right signal value limits, both of which have a zero degree-of-membership value, and a "center" signal value having the maximum degree-of-membership value; (b) a table-lookup function specified by an array of degree-of-membership values in memory indexed by the current integer signal value; and (c) a shape function specified by left and right signal range limits having zero degree-of-membership values, and the specification of a table-lookup function which defines a template shape (such as a bell-shape) from which the actual degree-of-membership values of the shape function are interpolated.

In accordance with the invention, the module performs fuzzy logic operations specified by a plurality of rules, each rule being expressed in a standard format which identifies one or more input condition(s) by specifying input membership function(s) and further specifying an output membership function. Using high speed integer arithmetic, the processing module derives the rule strengths for each rule, then performs an integer arithmetic center-of-gravity calculation to determine the desired, de-fuzzified output signal value.

For efficiency of storage, the input membership functions are preferably implemented as triangular functions whose membership values are calculated from the current input values by determining the membership function and input value line intersections. To speed execution, the output membership functions take the form of table lookup functions which may be dynamically precalculated by interpolation from predetermined shape function limit values.

These and other objects, features and advantages of the present invention may be better understood by considering the following detailed description.

BRIEF DESCRIPTION OF THE DRAWINGS

In the course of the description of the preferred embodiment which follows, reference will frequently be made to the attached drawings, in which.

DESCRIPTION OF THE PREFERRED EMBODIMENT

Overview

Figure 1:
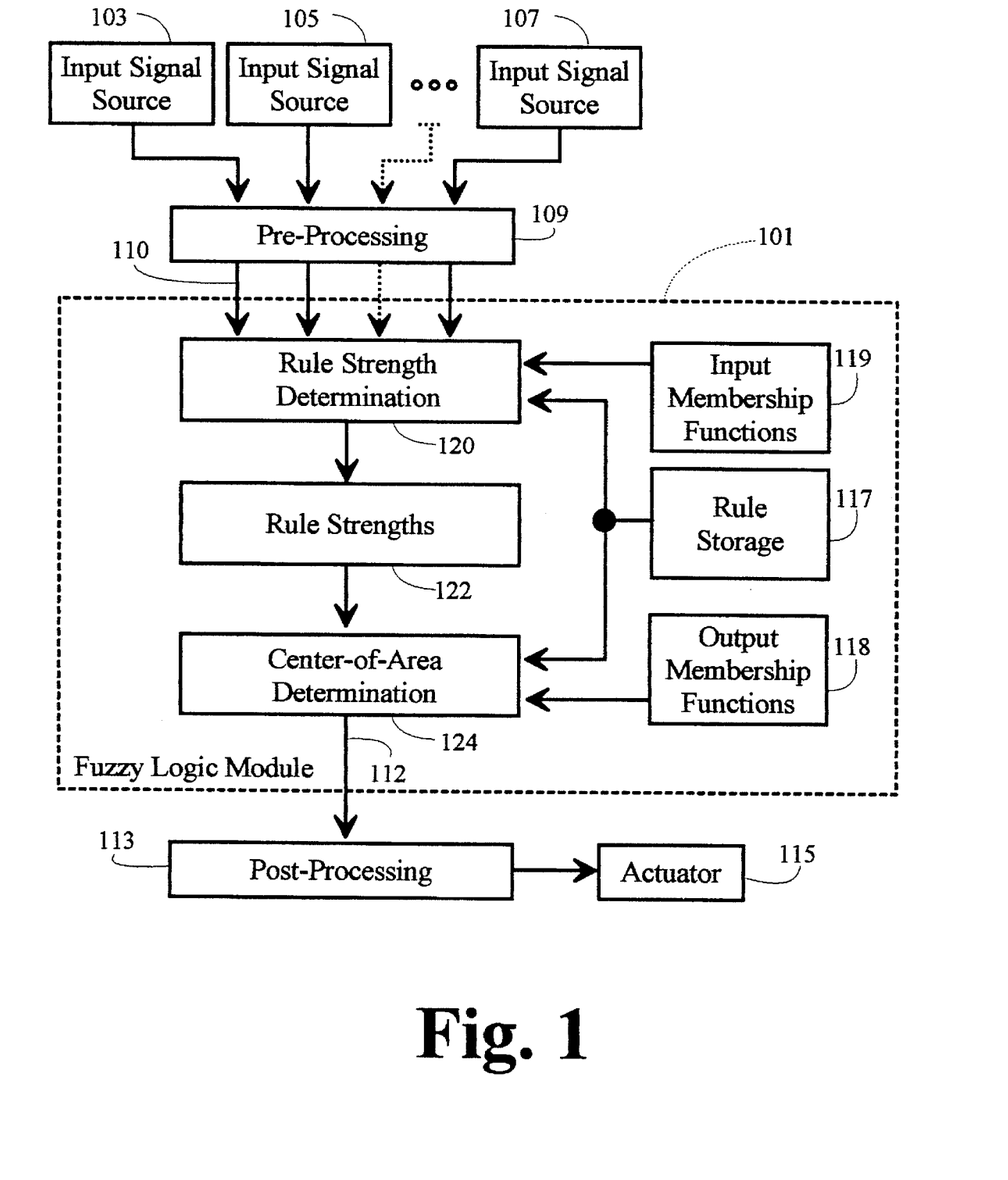
FIG. 1 is a block diagram illustrating the functional organization of the preferred embodiment of the invention.

The embodiment of the invention to be described utilizes a programmed microcontroller to perform general-purpose fuzzy logic control functions as generally shown in FIG. 1 of the drawings. The fuzzy logic module 101 accepts input signals from a several sources 103, 105 and 107, each signal being pre-processed at 109 to form normalized digital signals which take the form of integer values supplied to the module 101 by the fuzzy logic inputs 110. The module 101 repeatedly processes the current value of the digital input signals 110 to produce a sequence of digital integer output values at 112. This sequence of output values is then translated by suitable post-processing at 113 into a control signal for driving a utilization device, such as the actuator 115 seen in FIG. 1.

The logic module 101 creates the integer output signal values at 112 by comparing the input signals at 110 with conditions defined in a group of rules stored in memory at 117. The conditions expressed in the rules identify input membership functions which are stored at 119. The identified input membership functions from 119 are then used at 120 to determine a "rule strength" value for each rule indicating the extent to which the rule's input conditions are satisfied by one or more of the input signal value(s) at 110. The resulting rule strength values are stored temporarily at 122.

Using these stored rule strength values and the output membership functions 118, the module then determines a "center-of-gravity" value at 124 yielding the output integer value at 112. The center-of-gravity determination is performed in part by integrating degree-of-membership values produced by the output membership functions stored at 128 over the range of possible output integer values, each degree-of-membership value being limited by the rule strength values stored at 122. The results from the integration are then processed to form a center-of-gravity value delivered as the "de-fuzzified" output integer value at 112. This output integer represents the consensus of all of the rules whose conditions are satisfied, to varying degrees, by the input signal values at 110, and is converted by post-processing into a signal magnitude appropriate for controlling a utilization device, such as the actuator 115 shown in FIG. 1.

Standard Membership Functions

In accordance with the invention, the fuzzy logic module employs "fuzzy sets" defined by membership functions having predetermined formats which are stored in memory and which characterize the values assumable by both the input signals and the desired output signal. To permit the use of standard processing methods, each input signal is preprocessed at 109, before being supplied to the fuzzy logic module so that a normalized signal level is supplied at 110 in the form of a digital integer having a predetermined range of possible values, e.g., 0 to 40.

In addition, a predetermined number of fuzzy sets is used to characterize the possible values assumable by each input signal level. In the preferred embodiment, each signal value is a member of one or more of seven sets which may be indicated by the semantic designations "negative large," "negative medium," "negative small," "zero," "positive small," "positive medium," and "positive large." Signal values which are outside a given set are assigned a zero degree-of-membership value, whereas each possible signal value within a given set is associated with a degree-of-membership value expressed as an integer having a predetermined range. In the preferred embodiment described here, the maximum degree-of-membership in a set is represented by the integer 32. Membership functions are stored in memory to translate each integer signal value into a degree-of-membership values for any designated fuzzy set associated with that signal.

Triangular Membership Functions

Figure 2:
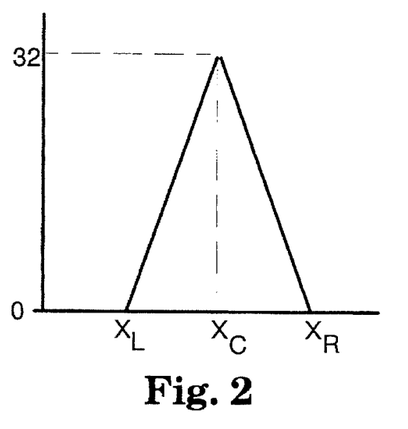
FIG. 2 is a graph of a triangular membership function used to convert signal values into degree-of-membership values for a fuzzy set.
Figure 3:
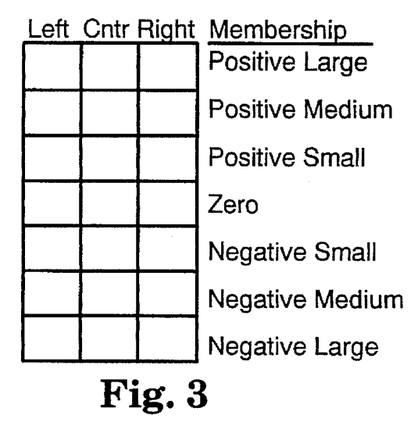
FIG. 3 is a memory map of the values needed to specify the values needed to define seven triangular membership functions for a given signal.

In order to efficiently store the potentially large number of data points necessary to define the membership functions needed for several input signals, the preferred embodiment stores each input membership function by defining the three corner points of a triangle. Triangular membership functions are bounded at the right and left by designated signal values representing the outer limits of signal values which are within the fuzzy set being defined. The third designated signal value indicates the signal value at which the maximum degree of set membership occurs. A representative standard triangular membership function defined by the three integer values $X_L$, $X_C$ and $X_R$ is shown in FIG. 2 of the drawings. FIG. 3 is a chart showing the array of stored integers which define the seven triangular fuzzy sets which are preferably used to evaluate each input signal.

Degree-of-membership values for triangular fuzzy set membership function are determined by locating the intersection of the vertical line, representing a signal value, with the triangle. The processing routine first determines whether the given input value lies within the boundaries of the triangle. If the input is outside the triangle, then the output degree-of-membership value is known to be zero since in input does not belong to that set. Once the input is determined to intersect the triangle, the routine determines if the input is to the fight or left of the maximum or "center" value, $X_C$. The routine then determines the Y (degree-of-membership) coordinate at the intersection point given the X coordinate by using the slope-line equations:

For inputs right of center (that is, inputs greater than $X_C$):

$$\text{Degree of Membership} = [(X_R - \text{Input}) * 32 / (X_R - X_C)]$$

For inputs left of center (that is, inputs less that $X_C$):

$$\text{Degree of Membership} = [(\text{Input} - X_L) * 32 / (X_C - X_L)].$$

The scaling factor 32 is chosen to give rule strengths of appropriate resolution within the dynamic range. The maximum degree-of-membership at the "center" value $X_C$ of a triangular membership function need not be midway between the two outer limits $X_R$ and $X_L$. For example, the fuzzy set "negative large" might be represented by a right triangle where both $X_C$ and $X_L$ are equal to 0, the lowest value assumable by an integer variable.

The corner-point designations for a group of seven triangular membership functions are preferably associated with each input function. The array of integers defining the seven triangular sets is illustrated in FIG. 3 of the drawings.

In accordance with the invention, each membership function is further identified in memory with a type indicator. For example, the value 1 indicates a triangular membership function while 2 indicates a table lookup membership function and 3 a bell-shaped function.

Table Lookup Membership Functions

The frequently accessed output membership functions stored at 118 are preferably represented in memory by table lookup values in order to speed computation. Each table lookup membership function is stored in memory as a sequence of numbers, beginning with the left and right outer range limits of the set $X_R$ and $X_L$, both of which yield zero degree-of-membership values, followed by $N=(X_R-X_L-1)$ degree-of-membership values respectively associated with the output signal values $(X_L+1)$ through $(X_R-1)$.

Figure 4:
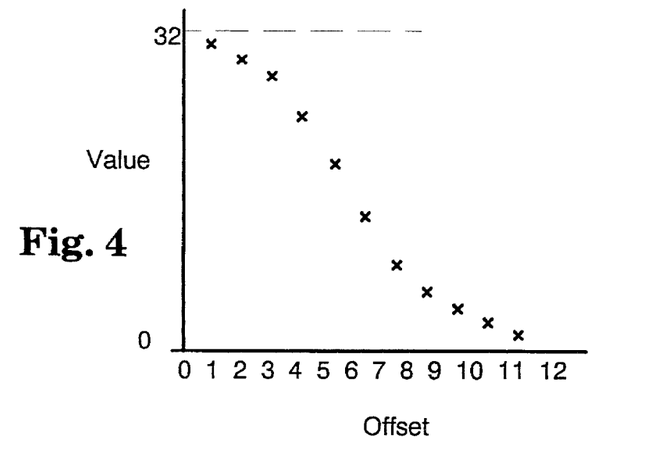
FIG. 4 is a graph showing the relative locations of values stored in memory for a representative table lookup membership function.

The shape of a typical lookup function (which may take any suitable form) is shown in FIG. 4. The data values for the lookup function are stored in memory as shown in the memory map of FIG. 5. The first two numbers, $X_R$ and $X_L$, of each function specify the outer limits of the fuzzy set, and the remaining values M1 through MN of each set represent the degree-of-membership values for the intermediate points. The lookup values graphically depicted in FIG. 4 might be appropriate for a "negative large" membership function defined by the stored data points: 0,12; 29,27,25, 21,19,16,13,11,8,5, and 3. With table look-up storage, the shape of the membership function is unlimited. It is, however, normally desirable to have a membership function that is continuous so that changes in the inputs don't cause abrupt changes in the output.

Bell-Shaped Membership Functions

Figure 5:
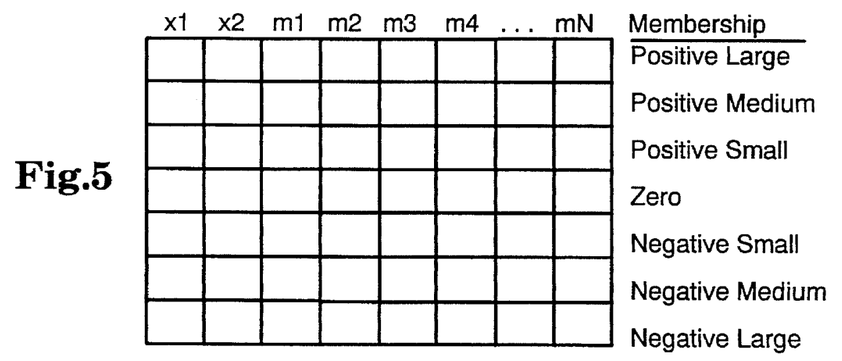
FIG. 5 is a memory map of the values which define lookup membership functions for each of seven sets associated with a given signal.
Figure 6:
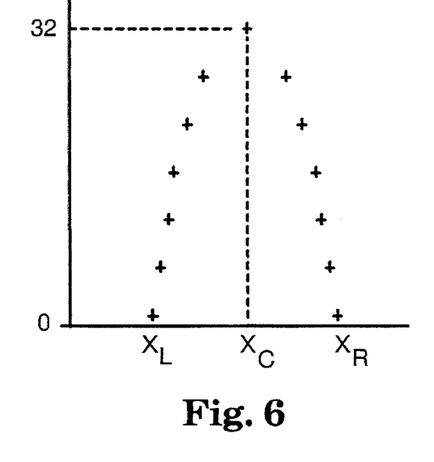
FIG. 6 is a graph showing the locations of values stored in memory for a shape function.
Figure 7:
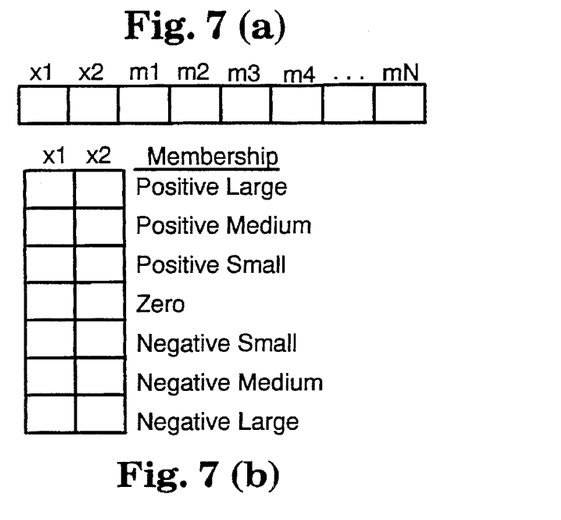
FIG. 7 is a memory map of the values needed to specify seven shape membership functions for a given signal.

Membership functions having predefined shapes may also be dynamically constructed at run time from stored template information. For example, a standard bell-shaped membership function having a shape depicted in FIG. 6 may be stored in a standard "high resolution" lookup table structure as seen in FIG. 7(a). As seen in FIG. 7(b), the upper and lower limits $X_L$ and $X_R$ only are stored for each of the seven fuzzy sets associated the semantic designation of the output memberships. The actual lookup function is then derived by interpolation from the high-resolution function, scaling that function to the proper limits for each of the seven sets. If high speed processing is not required, this interpolation may be accomplished as part of the processing of each input signal value. Alternatively, the interpolation may be performed during process initialization to create a complete lookup data point array, organized as shown in FIG. 5 of the drawings, for each of the seven fuzzy sets associated with a given signal variable.

Rule Storage

In accordance with the invention, the behavior of the fuzzy logic module is determined by a set of rules stored in memory, as seen at 117 in FIG. 1. The data structure used to define the rules consists of the following predetermined memory locations:

1. a memory location containing the value NoOfRules, the number of rules used to generate a given defuzzified output signal;
2. an array of rule addresses indexed by rule number; and
3. a variable length record structure for each rule defining one or more input signal conditions and an output directive.

Each input signal condition defined by a rule consists of a input identifier, which designates a particular input signal by number, and an input membership function identifier (e.g., nl, nm, ns, ze, ps, pm or pl) which specifies the particular fuzzy set to which the current value of the identified input signal must belong in order to satisfy the condition. Thus, an input condition might be expressed in a rule as "3,PS", a condition which would be satisfied whenever the current value of input3 is a member of the set PS (positive small).

Similarly, the output directive consists of the combination of an output identifier value and a membership function. For example, the output directive "output,pm" indicates that the output signal should be a member of the set pm (positive medium) when the rules input conditions are satisfied.

A rule may contain more than one input condition. Thus, the rule "1,nl,2,ze,output,ns" can be stated as the linguistic proposition "if input1 is negative large and input2 is zero then the output should be negative small."

Rule Processing

Figure 8:
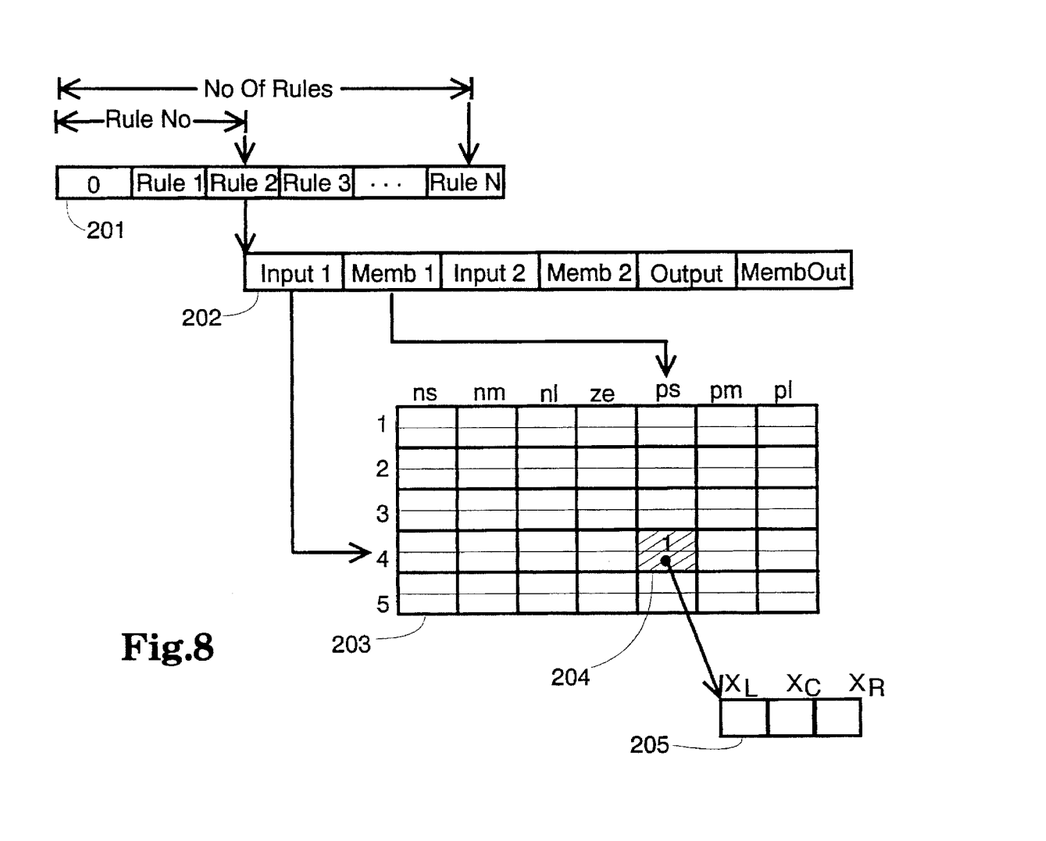
FIG. 8 is a memory map illustrating the addressing mechanism used to specify the set of membership functions during the processing of a collection of rules to determine a defuzzified output value from a designated group of input values.

FIG. 8 of the drawings illustrates the manner in which, given a stored collection of rules, the fuzzy logic module locates the information structures required to calculate "rule strength" values.

The rules themselves are stored in memory at addresses which are stored at 201 in an array of rule addresses. The rules may accordingly be accessed, by the rule number, from 1 up to and including the value NoOfRules, which is stored in memory to specify the last rule stored. In the example shown in FIG. 8, the array 201 is indexed by rule number 2 to yield the address of the second rule 202. The second rule at 202 contains a pair of input conditions and an output directive. The first condition identifies the particular input signal to be tested, Input1 =4, to specify row 4 in an array 203 which contains membership function identification information for signal number 4 as defined in 110. The column of array 203 is specified by the first membership function identifier Memb1 in the rule 202. In FIG. the value of Memb1 is "ps"(positive small), thus specifying the cell 204. The cell 204 contains two values: the first value "1" specifies the type of membership function (triangular) which has been selected to define the "ps" (positive small) set for the fourth input signal. The second portion of cell 204 contains the address of the data defining the triangular function which, in this case, is a triangular function defined by the three corner values $X_L$, $X_C$ and $X_R$ stored at 205. In the same way, the fuzzy logic module is able to identify the type and location of every membership function and its associated input signal in order to evaluate all of the rules governing the fuzzy logic translation of the sensed input signals into a desired output signal.

Rule Strength Determination

As indicated in the block diagram of FIG. 1, the fuzzy logic module contemplated by the present invention processes the input signals at 110 by first determining the strengths of the rules, given the current input values, and stores the rule strengths at 122. After the rule strengths have been determined, the process then determines a center-of-gravity value at 124. This processing is shown in more detail in the flowchart, FIG. 9.

Figure 9:
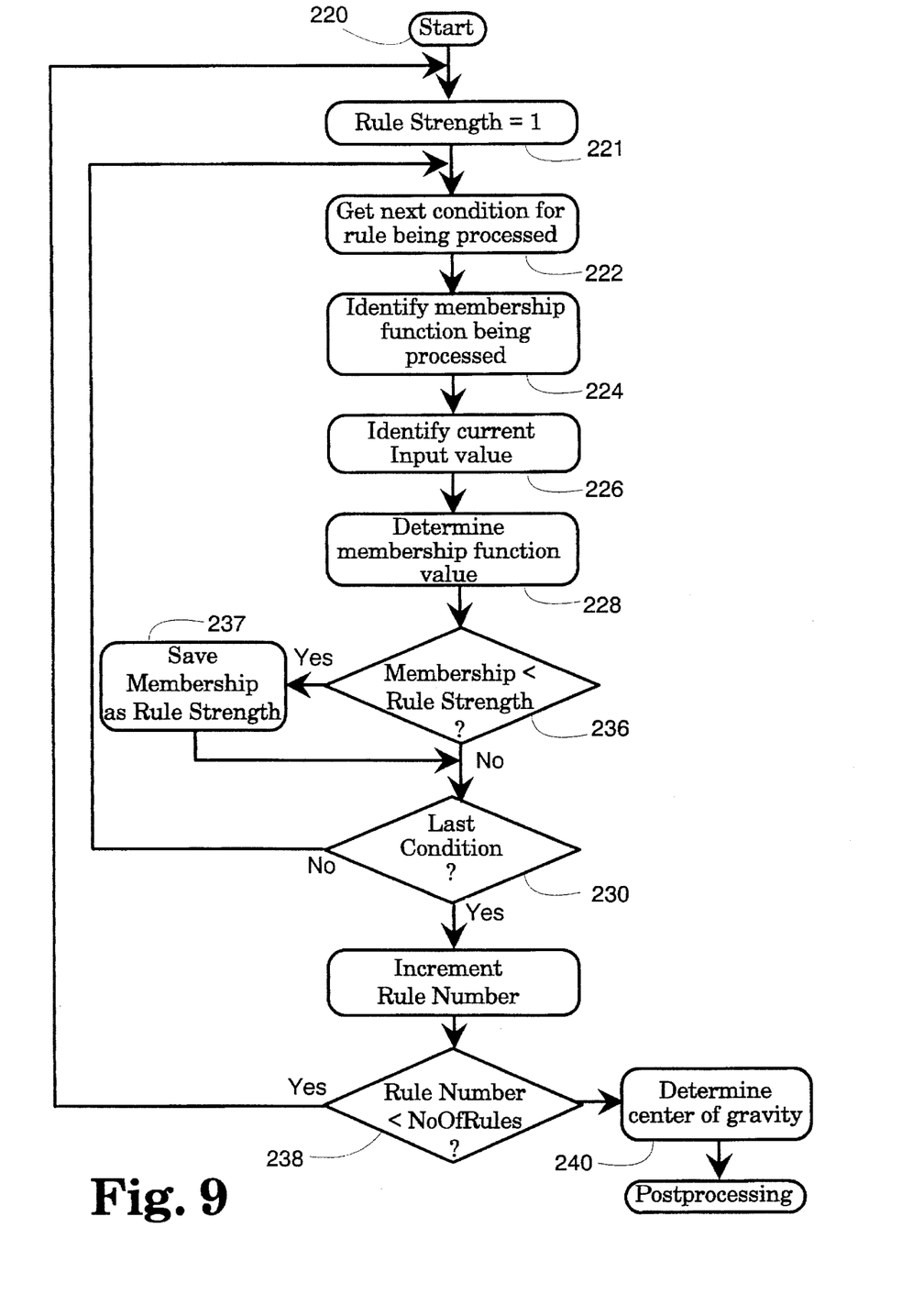
FIG. 9 is a flow chart illustrating the processing steps used to evaluate the applicability of a collection of fuzzy logic rules to develop an output control signal magnitude.

Rule processing begins at 220 as seen in FIG. 9. Before each rule is evaluated, its rule strength variable is initialized to 1 at 221. Each rule condition is then identified at 222, its membership function is located at 224, and the current value of the input signal associated with that condition is obtained at 226. The membership value specified by the located membership function given the associated input signal value is then determined at 228.

In the specific embodiment of the invention shown in FIG. 9, those rules which contain more than one condition combine those conditions using a logical AND operator. Rules which combine conditions using the logical OR operator are not used; instead, equivalent relationships are established using separate rules to exress the separate conditions. By limiting the relationship between conditions within a rule in this fashion, processing is simplified and less storage space is consumed by the rules, which need not include fields indicating the logical relationship between conditions.

The fuzzy logic equivalent of the AND operation is performed by selecting the minimum (MIN) condition membership value among the conditions within a rule. Thus, if any condition is totally unsatisfied (that is, evaluates to a zero value), the result is zero. For single condition rules, the "rule strength" of each rule is simply the output of the single identified membership function given the current input value. If the rule has more than one condition, the rule strength to be saved for later processing is the minimum membership value, located by the test at 236 and saved at 237. If the conditions within a given rule were joined by a logical OR operator, then the appropriate result of the logical combination would be formed by the maximum (MAX) of the condition membership values.

After each rule strength is stored, the current rule number is compared with NoOfRules at 238 to determine if more rules are to be processed. If not, the process continues with the next step, the determination of the center-of-gravity at 240.

Figure 10:
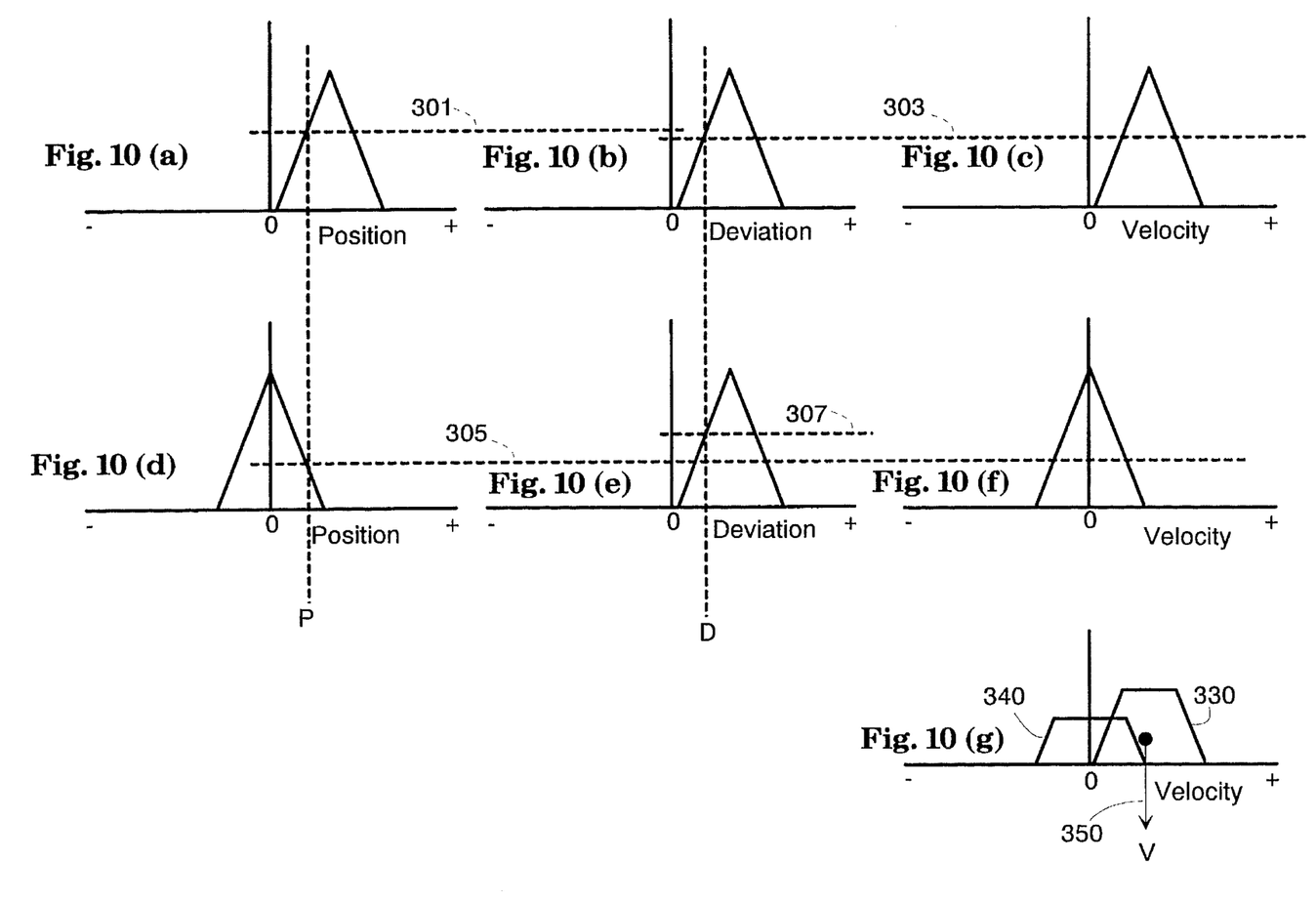
FIG. 10, parts (a) through (g)., are illustrative graphs showing the triangular input and output membership functions defined by two rules and the manner in which those rules are processed with respect to two input signals to yield an output control value.

The processing steps described above are illustrated graphically in FIG. 10, parts (a) through (f), which depicts a control system for generating a output signal indicating a desired velocity V from two input signals, a position signal P and a deviation signal D, based on two rules. FIG. 10(a)–(c) illustrate the first rule which might be written "P,ps,D,ps,output,ps"; that is, if input the position P is positive small and the deviation D is positive small then the velocity V should be positive small." FIG. 10(d)–(f) illustrates a second rule which could be written as "P,ze,D,ps, output,ze" or "if P is zero and D is positive small then V is zero."Example input signal values P and D are shown by the dotted vertical lines P and D in FIG. 10.

The first condition seen in FIG. 10(a) is satisfied if the position signal P is positive small. P intersects the triangular membership function, yielding the degree-of-membership value indicated by the horizontal line 301. For the second condition of the first rule, the smaller amplitude input signal value D (deviation) also satisfies the triangular membership function seen in FIG. 10(b), yielding the degree-of-membership value 303. Since value 303 is smaller than the value 301, it becomes the stored "rule strength" value for the first rule.

P and D also satisfy both input conditions of the second rule, as illustrated at FIGS. 10(d) and 10(f). The smaller degree-of-membership value 305 from the first condition at FIG. 10(d) is smaller than the value 307 produced by the membership function at FIG. 10(e), so that the value indicated by 305 is stored as the rule strength for the second rule.

As next discussed, these two stored rule strength values are then used to determine the center of gravity, as next discussed.

Center of Gravity Determination

As indicated in FIG. 1 at 122 and 124, after the strength of each rule has been determined for the current input signal values, the module next determines a "center of gravity" value representing the "de-fuzzified" consensus of all of the rules which have been satisfied, as indicated by non-zero rule strength values.

Figure 12:
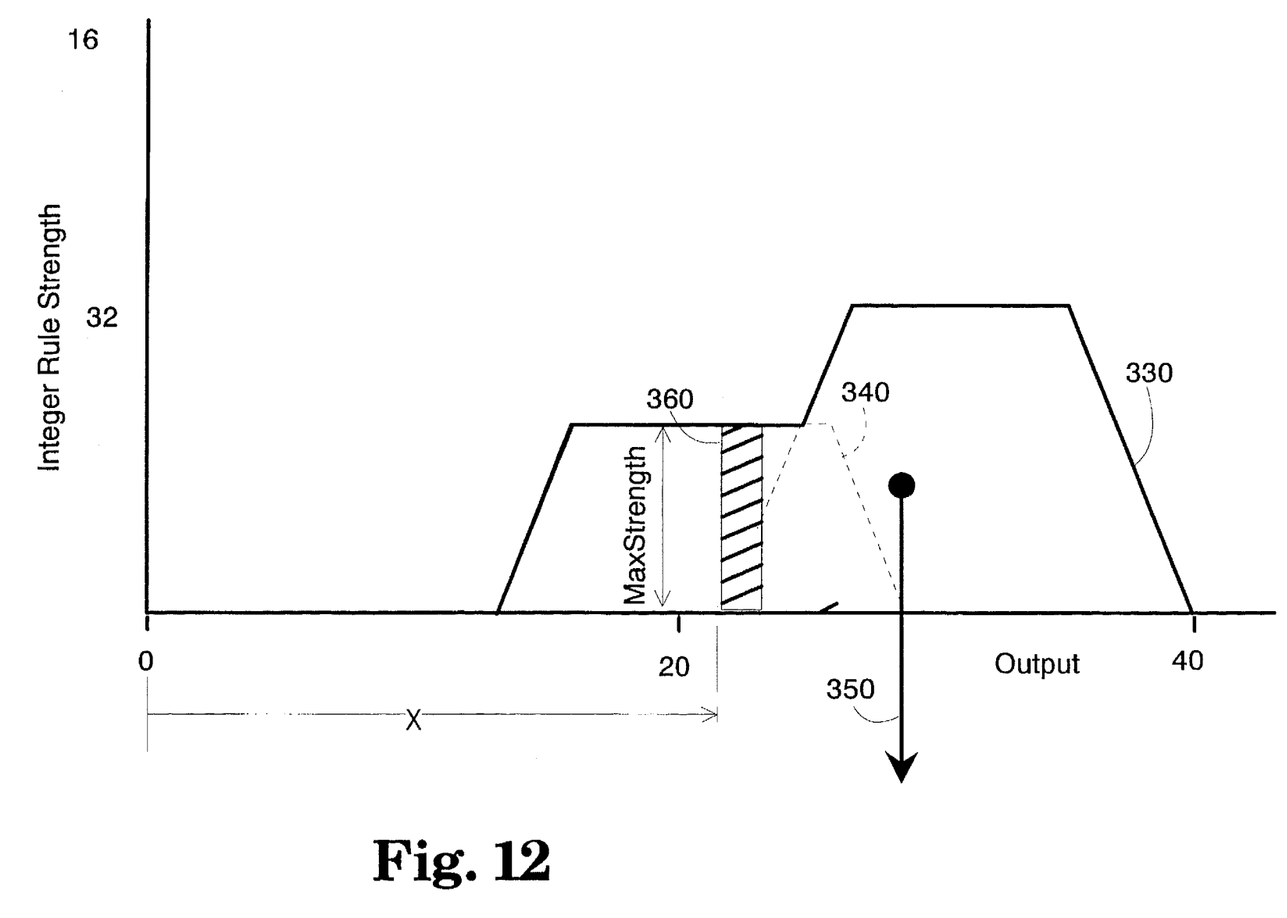
FIG. 12 is an enlargement of FIG. 9(g) which illustrates the mechanism for determining a center-of-gravity value.

The de-fuzzified output value is determined by a numerical integration process which is illustrated by FIG. 10(g), which is enlarged in FIG. 12. The output value is determined by integrating the area under a curve formed by the point-to-point maximum output degree-of- membership value of each satisfied rule, as limited by that rule's strength. This curve is seen in FIGS. 10(g) and 12, and represents the maximum of two trapezoid shapes 330 and 340. Trapezoid 330 is the curve formed by the triangular output membership function of the first rule seen in FIG. 10(c) as limited by that rule's strength value 303. The smaller trapezoid 340 is formed by the triangular output membership function of the second rule seen in FIG. 10(f), as limited by the second rule's strength value 305. The first rule, which was more strongly satisfied than the second rule, indicated that the output value V should be within the set "positive small" while the second rule, which was less strongly satisfied, indicated that the output value V should be within the set "zero". The defuzzification process provides a defuzzified result signal which represents a consensus value, visually seen in FIGS. 10(g) and 12 as the center-of-gravity 350 of the area under the curve formed by the maximum of the two trapezoidal shapes 330 and 340.

Figure 11:
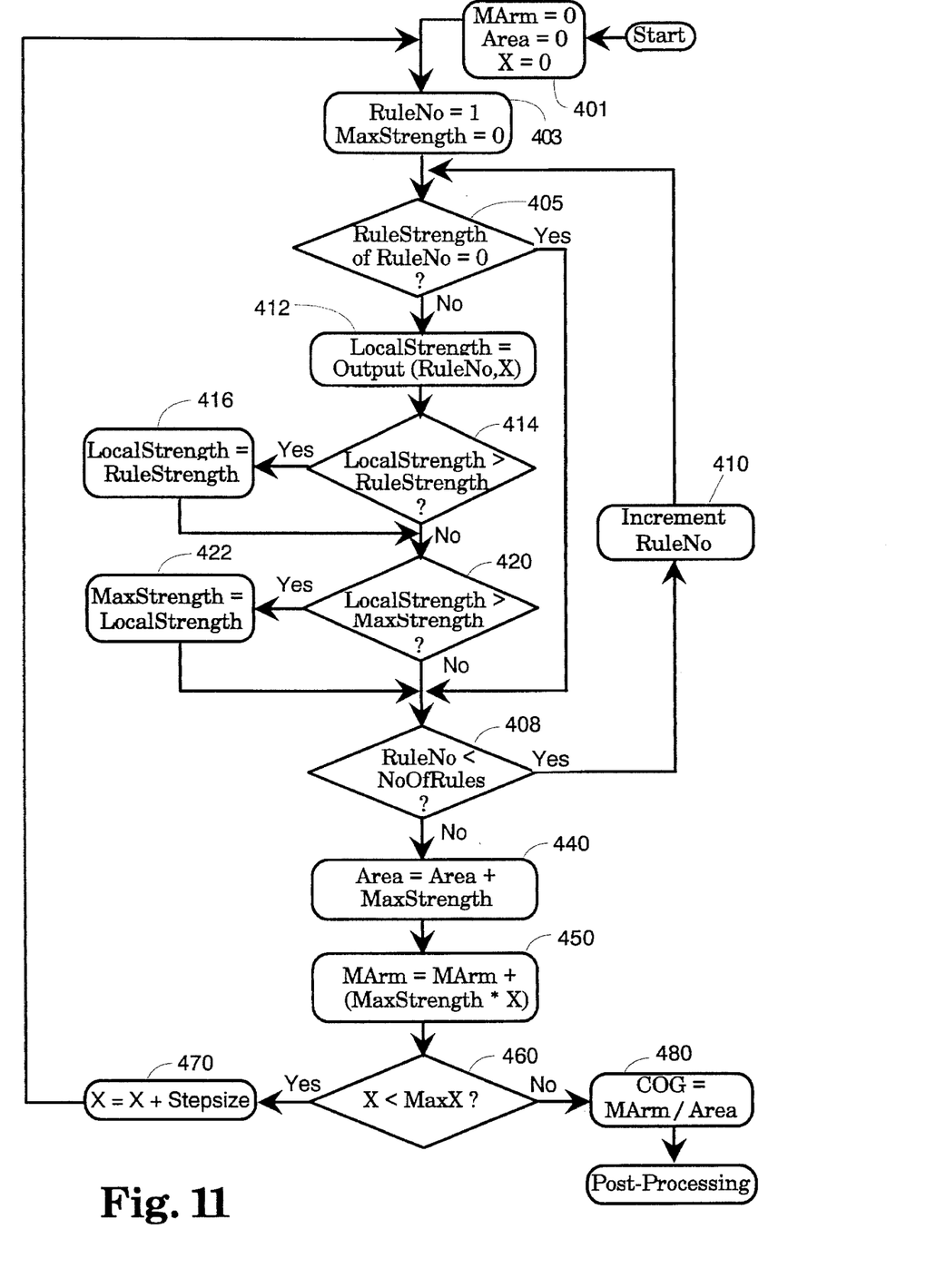
FIG. 11 is a flowchart illustrating the processing steps used in performing the center-of-gravity determination to form the desired output signal magnitude in accordance with the invention.

The preferred method for determining the center-of-gravity value is illustrated in more detail by the flowchart seen in FIG. 11 of the drawings. The procedure produces, by numeric integration, two values: a total moment arm value MArm and a total area value Area, both of which are initialized to zero at 401 as soon as the routine starts at the entry point indicated at 400 in FIG. 11. The integration is repeated by varying the value of the output variable X from 0 through MaxX. The values for the variables RuleNo and MaxStrength are initialized to 1 and zero respectively at 403 (and are re-initialized to those values at 403 for each new value of X).

The rule strength previously determined (at discussed above in connection with FIG. 9) for the rule identified by RuleNo is then checked at 405. If the rule strength is zero, that rule will not make a contribution to the output value and an immediate jump is accordingly made to 408, where current value of RuleNo is checked to determine if it is equal to RuleNo, and hence identifies the last rule to be processed. If RuleNo is less than NoOfRules, RuleNo is incremented to the next rule number at 410 and a return is made to 405 to continue the processing of that rule.

If RuleStrength is non-zero, control is passed to 412 where the output membership function for the rule specified by RuleNo is used to determine a degree-of-membership value LocalStrength, given the current value of X. LocalStrength is then compared at 414 to the RuleStrength value previously determined for the rule specified by RuleNo. If the rule's rule strength is less than LocalStrength, LocalStrength is replaced by that smaller value at 416. At this time, LocalStrength is an integer representative of the rule's directive value, taking into account the current input signal values, the degree to which those input signal values satisfy the rule's input conditions, and the value specified by the rules output membership function for the current value of X If the resulting rule directive value LocalStrength after the test at 414 is greater than MaxStrength, it replaces the former value of MaxStrength at 422, so that MaxStrength holds the maximum directive value produced by one of the rules after all of the rules have been processed for a given value of X (as indicated when RuleNo is no longer less than NoOfRules when tested at 408).

Thus, as seen in the graph of FIG. 12, the routine described above determines the value MaxStrength for each value of X, and MaxStrength corresponds to the height of a subarea of integration indicated by the shaded rectangle 360 in FIG. 12. The total area under the curve defined by a succession of MaxStrength values as X changes is determined by accumulating the values of MaxStrength in the variable Area as indicated at 440 in FIG. 11. The value MArm is then incremented at 450 by the moment arm of the subarea, which is equal to the product (X * MaxStrength). The value of X is then tested at 460 to determine if the end of the integration interval Maxx has been reached. If not, X is incremented by the value Stepsize at 470 control is returned to 403 to re-initialize RuleNo and MaxStrength for the next X value to be processed.

At the conclusion of the integration interval, the center-of-gravity value COG is determined by dividing MArm by Area at 480. The module then passes this value, which represents the desired defuzzified output signal, to an appropriate utilization routine for postprocessing at 490.

Software Implementation

As previously indicated, the present invention advantageously takes the form of a sharable, multipurpose fuzzy logic mechanism implemented by means of a microprocessor and memory containing suitable programs and data structures for providing the desired fuzzy logic functions. The following assembly language routine, is executable on an Intel 196KR microcontroller (as converted into an executable module using the corresponding Intel Assembler/Linker/Compiler, both of which are available from Intel Corporation, Santa Clara, Calif. 95052.

```
1    SOURCE LANGUAGE LISTING
2    ;-+-+-+-+-+-+-+-+-+-+-+-+-+-+-+-+-+-+-+-+-+-+-+-+-+-+-+-+-+-+-+-+
3    ;                          Fuzzy Control Routine
4    ;                     Copyrighted 1993 Ford Motor Company
5    ;-+-+-+-+-+-+-+-+-+-+-+-+-+-+-+-+-+-+-+-+-+-+-+-+-+-+-+-+-+-+-+-+
6    ;
7    FuzzyControl:
8    ;
9            LDB       Temp7,WhlFlg[ChIndex]       ;Check if in abs?
10           BBC       Temp7,3,ExtCntrl
11   ;
12           LD        Temp2,#01                   ;start with first rule
13           CLR       Temp0                       ;index into rule base
14           CLRB      RulFctn                     ;set no clause
15           LD        Toggle,#01
16   ;
17   NxtCls:
18   ;........................
19   GetClause:                                    ;get initial clause of rule
20           LDB       InputNo,Rule1[Temp0]        ;Temp0=RuleIndex
21           INC       Temp0                       ;Index into rules start
22           LDB       Membership,Rule1[Temp0]     ;index at rule1
23           INC       Temp0
24           LDB       Clause,Rule1[Temp0]
25           INC       Temp0
```

```
26   ExtGC:
27   ;............................
28   XtractLCR:                                ;get Left Center Right of
29           PUSH    Temp0
30   ;
31           LDBZE   FzTemp,InputNo
32           SHLB    FzTemp,#1
33           LD      Temp0,InMemb[FzTemp]      ;get address of input memb fctn
34           LDBZE   FzTemp,Membership         ;get membership data
35           ADD     Temp0,FzTemp
36           LD      MemLt,[Temp0]+            ;get Memb left limit
37           LD      MemCt,[Temp0]+            ;get Memb center limit
38           LD      MemRt,[Temp0]             ;get Memb right limit
39   ;
40           POP     Temp0
41   ;............................
42   Triangle:
43   ;............................
44   GetInput:
45   ;               Gets the input value specified by fuzzy
46   ;               and loads FzInput with the data
47           CMPB    InputNo,#1                ;Check if input 1 selected
48           BNE     I2                        ;Slip input
49           LDBZE   FzInput,PerSlip[ChIndex]
50           BR      GotInput
51   I2:
52           LD      FzInput,GWhl[ChIndex]     ;GWhl input
53           LdB     FzTemp,WhlFlg[ChIndex]
54           BBS     FzTemp,0,GotInput         ;if GPos exit else
55           NEG     FzInput                   ;set negative bit
56   GotInput:                                 ;*** input 3 removed ***
57   ;............................
58   ;
59           XOR     Toggle,#01
60           ADD     Temp6,Temp2,Toggle        ;Temp2-RuleNo
61   ;
62   ;............................
63   CalcMFS:                                  ;output: Temp4-RS of memb. fctn
64   LtLim:
65           CMP     FzInput,MemLt             ;check if less then left limit
66           JGT     RtLim
67           CLR     Temp4                     ;load rule strength with zero
68           BR      RetCMFS                   ;Ret to calling routine
69   RtLim:
```

```
70           CMP      FzInput,MemRt              ;check if greater than right
71  limit
72           JLT      CalcRS                     ;within limit calculate rule
73  strgth
74           CLR      Temp4                      ;load rule strength with zero
75           BR       RetCMFS
76  ;
77  CalcRS:
78           LD       FzTemp,Temp6               ;Upper byte of SHLL instruction
79           CMP      FzInput,MemCt              ;check if left or right of
80  center
81           JLT      LtOfCtr
82  RtOfCtr:
83           SUB      Temp4,MemRt,FzInput        ;[(R-I)*32/(R-C)]=RS
84           MULU     Temp4,#32
85           SUB      U1,MemRt,MemCt             ;use U1 as a temporary register
86           DIVU     Temp4,U1
87           BR       ExtCMFS
88  LtOfCtr:
89           SUB      Temp4,FzInput,MemLt        ;[(I-L)*32/(C-L)]=RS
90           MULU     Temp4,#32
91           SUB      U1,MemCt,MemLt
92           DIVU     Temp4,U1
93  ExtCMFS:
94           LD       Temp6,FzTemp               ;Don't return if used as inline
95  ;..................................
96  RetCMFS:
97           STB      Temp4,RuleStrength[Temp6]
98  ;
99  CkClause:
100          CMPB     RulFctn,#00                ;check if end/begging of rule
101          JNE      XRule                      ;execute rule in RS0 RS1
102          CMPB     Clause,#00                 ;check if next clause=00
103          JE       NxtRule
104          LDB      RulFctn,Clause
105          BR       NxtCls
106 ;
107 XRule:
108          CMPB     RulFctn,#FAnd              ;check if & function requested
109          JE       CallAnd
110          CMPB     RulFctn,#FOr               ;check if | fucntion requested
111          JE       CallOr
112 CallNot:
113          CALL     FzNot                      ;DO FUZZY NOT
```

```
114             BR      ExtXR
115     CallAnd:
116             CALL    FzAnd                   ;DO FUZZY AND
117             BR      ExtXR
118     CallOr:
119             CALL    FzOr                    ;DO FUZZY OR
120     ExtXR:
121             CLR     Toggle                  ;Toggle=00
122             LDB     RulFctn,Clause          ;get next clause
123             CMPB    Clause,#00              ;check if end of rule
124             JE      NxtRule
125             BR      NxtCls                  ;get next clause
126     NxtRule:
127             INC     Temp0                   ;ruleIndex++
128             LDB     Toggle,#01
129             INCB    Temp2                   ;next rule number
130             CMPB    Temp2,NoOfRules         ;check if end of rules
131             BLE     NxtCls
132     ;-+-+-+-+-+-+-+-+-+-+-+-+-+-+-+-+-+-+-+-+-+-+-+-+-+-+-+-+-+-+-+
133     ControlU:
134             LDB     FzInput,#0              ;for (UInput=1,UInput>40;++)
135             CLR     TArea                   ;Total Area=0
136             CLR     MArm                    ;MomentArm=0
137             LDB     Temp2,#1                ;RuleNo=1
138     InLoop:
139             CLR     MaxRS                   ;MaxRS=0
140     RuleLoop:
141             LDBZE   Membership,FzOut[Temp2] ;Get Output Membership
142     ;
143     ;..........................................
144     U_Mfs:
145             CLR     Temp4
146             LDBZE   U1,Du[Membership]       ;Get left limit of triangle
147             CMP     FzInput,U1              ;check of out of limit
148             BLE     ExtU_Mfs
149     ;
150             INC     Membership
151             LDBZE   FzTemp,Du[Membership]   ;Get right limit of triangle
152             CMP     FzInput,FzTemp          ;check if within limits
153             BGE     ExtU_Mfs
154     ;
155             SUB     FzTemp,FzInput,U1       ;Get index into DU
156             ADD     Membership,FzTemp
157             LDB     Temp4,Du[Membership]
```

```
158     ExtU_Mfs:
159     ;....................................
160     ;
161             CMPB    Temp4,RuleStrength[Temp2]
162             BNH     CkMRS                       ;check if RS>allowable RS
163             LDBZE   Temp4,RuleStrength[Temp2]
164     CkMRS:
165             CMP     MaxRS,Temp4
166             JGE     IncRulNo
167             LD      MaxRS,Temp4                 ;Save max value of centroid
168     IncRulNo:
169             INC     Temp2                       ;RuleNo++
170             CMPB    Temp2,NoOfRules             ;check if done with set of
171     rules
172             BNH     RuleLoop
173     IncFzIn:
174             ADD     TArea,MaxRS                 ;Total Area
175             MULU    MaxRS,FzInput               ;use MaxRS as temp Moment Arm #
176             ADD     MArm,MaxRS                  ;MArm=MArm+new_marm
177             ADD     FzInput,#1
178     NoAugmtFzI:
179             LD      Temp2,#1                    ;reset RuleNo to 1
180             CMPB    FzInput,#40                 ;No of slices in output calc
181             BNH     InLoop
182     ;
183     CalcU:
184             CMP     TArea,#0                    ;check if fzinput is out of
185     bounds
186             BNE     OutputU
187     OutUZero:                                   ;input out of range set output
188             LD      U,#20                       ;set U to zero Output
189             BR      ConvertOutU
190     OutputU:
191             CLR     U1                          ;set upper word for div to 0
192             LD      U,MArm                      ;U=Marm/Area
193             DIVU    U,TArea                     ;giving the output U
194     ;
195                             -- END OF LISTING --
196
```

What is claimed is:

1. A digital fuzzy logic system comprising:

a source of a plurality of input signal values;

a processor;

a memory connected to said processor for storing data and for further storing instructions which are executable by said processor for manipulating said data, and a utilization device connected to said processor and responsive to a digital output signal value produced by said processor;

wherein said processor and said memory operate cooperatively to form a fuzzy logic controller comprising:

means for processing said input signal values into a corresponding set of input integer values;

means for storing plural sets of function definition values, means for storing instructions for performing a plurality of different standard membership functions, each of said functions when executed producing a degree-of-membership value in accordance with the combination of a supplied integer value and a specified one of said sets of function definition values;

means for storing data representative of a plurality of rules, each of said rules specifying at least:
(a) a first one of said input integer values,
(b) a first one of said sets of function definition values,
(c) a first one of said standard membership functions,
(d) a second one of said set of function definition values, and
(e) a second one of said standard membership functions;

means responsive to each given one of said rules for forming a strength value for said rule, said means comprising:
means for executing said first standard membership function specified in said given rule to produce an intermediate integer value in accordance with the first input integer value specified by said given rule and the first set of function definition values specified by said given rule, and
means for executing said second standard membership function specified by said given rule to produce said strength value for said given rule in accordance with said intermediate integer value and the second set of function definition values specified by said given rule; and means for producing said digital output signal value by forming the weighted combination of the strength value formed in response to each of said plurality of rules.

2. Apparatus as set forth in claim 1 wherein said plurality of different standard membership functions are selected from a group comprising:
a) a triangular function which when executed produces a degree-of-membership value in accordance with function definition values representative of left and right signal value limits associated with a minimum degree-of-membership values and a center signal value associated with a maximum degree-of-membership value,
b) a table-lookup function which when executed produces a degree-of-membership value in accordance with function definition values represented by an array of degree-of-membership values each corresponding to a possible signal value, and
c) an interpolated function which when executed produces a degree-of-membership value by interpolating between adjacent ones of said function definition values.

3. Apparatus as set forth in claim 2 wherein said second one of said standard membership functions specified for each of said rules is a table-lookup function.

4. Apparatus as set forth in claim 3 wherein said first one of said standard membership functions specified for each of said rules is a triangular function.

* * * * *